US008867507B2

(12) United States Patent
Karunakaran et al.

(10) Patent No.: US 8,867,507 B2
(45) Date of Patent: Oct. 21, 2014

(54) SPLIT-PLANE WIRELESS NETWORK ARCHITECTURE

(75) Inventors: Kumara Das Karunakaran, San Jose, CA (US); Seemant Choudhary, Fremont, CA (US); William Stanislaus, Fremont, CA (US); Tilak Ravi, Milpitas, CA (US)

(73) Assignee: Avaya Inc., Basking Ridge, NJ (US)

( * ) Notice: Subject to any disclaimer, the term of this patent is extended or adjusted under 35 U.S.C. 154(b) by 1196 days.

(21) Appl. No.: 12/765,402

(22) Filed: Apr. 22, 2010

(65) Prior Publication Data

US 2010/0290396 A1 Nov. 18, 2010

Related U.S. Application Data

(60) Provisional application No. 61/178,290, filed on May 14, 2009.

(51) Int. Cl.
| | |
|---|---|
| *H04W 4/00* | (2009.01) |
| *H04L 12/717* | (2013.01) |
| *H04L 12/715* | (2013.01) |
| *H04L 12/46* | (2006.01) |
| *H04W 40/24* | (2009.01) |

(52) U.S. Cl.
CPC ............... *H04L 45/42* (2013.01); *H04L 45/04* (2013.01); *H04L 12/467* (2013.01); *H04W 40/24* (2013.01)
USPC ........................................................ 370/338

(58) Field of Classification Search
None
See application file for complete search history.

(56) References Cited

U.S. PATENT DOCUMENTS

| | | | | |
|---|---|---|---|---|
| 2007/0002723 | A1* | 1/2007 | Vare et al. | 370/203 |
| 2007/0064673 | A1 | 3/2007 | Bhandaru et al. | |
| 2007/0069953 | A1* | 3/2007 | Ling et al. | 342/463 |
| 2007/0155401 | A1* | 7/2007 | Ward et al. | 455/456.1 |
| 2009/0184963 | A1* | 7/2009 | Shiomi et al. | 345/428 |
| 2009/0274128 | A1 | 11/2009 | Zhang et al. | |
| 2010/0290396 | A1* | 11/2010 | Karunakaran et al. | 370/328 |
| 2011/0013557 | A1* | 1/2011 | Westberg et al. | 370/328 |

FOREIGN PATENT DOCUMENTS

| | | |
|---|---|---|
| EP | 1 758 307 A1 | 2/2007 |
| WO | WO 02/097560 A2 | 12/2002 |
| WO | WO 2007/066386 A1 | 6/2007 |

OTHER PUBLICATIONS

European Search Report dated Aug. 19, 2010.

* cited by examiner

*Primary Examiner* — Kwang B Yao
*Assistant Examiner* — Tung Q Tran
(74) *Attorney, Agent, or Firm* — Anderson Gorecki & Rouille LLP (57) ABSTRACT

A split-plane mobility network architecture separates control and data plane operations typically encapsulated in a conventional wireless controller. Configurations provide a unified split-plane mobility switch that separates the data transport and switching in a separate hardware element, and performs control plane operations via exchanges with a centralized topology, rather than simply by adjacent switches within range. In contrast to conventional switch deployment, in which the same switch handles processing demands of the control plane and the data plane, the disclosed approach separates the data plane processing base by employing a mobility agent to define adjacent switch visibility. Thus, the routing capabilities of the data plane may be enhanced, such as to handle increasingly bandwidth-hungry applications of the same user base, without uprooting the infrastructure defined by the control plane.

17 Claims, 7 Drawing Sheets

SPLIT-PLANE WIRELESS NETWORK ARCHITECTURE

CROSS REFERENCE TO RELATED APPLICATIONS

This Patent Application claims the benefit under 35 U.S.C. §119(e) of U.S. Provisional Patent Application No. 61/178,290 filed on May 14, 2009, entitled, "Architecture for Efficiently Unifying Wired and Wireless Access Infrastructure," the contents and teachings of which are hereby incorporated by reference in their entirety.

BACKGROUND

Wireless networks have gained popularity in recent years as the onset of cellphones has led to ever increasing computing capability in the form of a hand-held or highly portable personal wireless device. So-called WiFi and newer WiMax capabilities provide wireless routing and throughput at transmission rates once achievable only by wired connections. Newer wireless mobile devices provide capabilities of email, media playback, and web browsing once only available in wired devices. As popularity of personal mobile devices increases, developers continue to produce increasingly bandwidth-hungry applications. Thus, the resulting user demand triggers an industry response resulting in increasing per-user bandwidth consumption. The underlying network infrastructure supporting this wireless demand therefore continues to be pushed to transport additional bandwidth for supporting the user base.

SUMMARY

Wireless networks strive to provide performance similar to that of wired networks, and tend to be focused on individual consumer needs, such as email, voice calls, Internet browsing, and other computational activities that appeal to ad-hoc and spontaneous needs of an individual user, as opposed to regular and predictable business and industrial uses that often require additional and more predictable bandwidth. However, the proliferation of WiFi enabled devices, and more recently WiMax based communications, has led to increasing use of wireless networks even in corporate environments. Accordingly, modern network management recognizes both wired and wireless operations, as opposed to conventional wired network management that addressed wireless operations as a separate tangential aspect or else not at all.

In a conventional network, message traffic is transported across a series of "hops" between network elements, such as routers, switches and hubs, between a source and a destination. User admission to the network is typically performed by a login and authentication exchange with an administration server or node. Following these initial administrative operations, subsequent operations include exchanges with various network entities, such as a user browser websites or receiving email, and result in message traffic exchanges between the user and visited websites over the switching fabric provided by the network elements. Administrative operations for network admission via login and authentication, access control, radio frequency management and topological configuration such as routing tables and priorities are so-called control plane operations, in contrast to data plane operations which perform transport and switching of data to and from admitted users.

Conventional wired networks adapted to the introduction of WiFi according to IEEE 802.11b/g, and wireless operation was typically viewed as an add-on to conventional networks. Thus, network administrators addressed the novel technology by adding a few wireless access points and controllers as appendages to the wired infrastructure. As advances in the wireless technology evolved, high throughput (HT) transport was introduced in 802.11n, resulting in an exponential increase in bandwidth demand, while users continued to grow linearly. The next phase of WiFi and WiMax wireless transport will likely encounter similar bottlenecks as bandwidth hungry multimedia applications continue to gain popularity on portable mobile devices such as cellphones, laptops and PDAs.

Wireless extensions to conventional wired (L2/L3) switching involves tunnels for supporting mobile users. Mobility tunnels communicate between switches support a roaming user, and access tunnels afford access to a mobile device via an access point serving a coverage area of the user, discussed further below. The data plane operates like a L2 or L3 switch on top of virtual ports created by the access and mobility tunnels. The links between the switches and access points, also described further below, includes establishing such tunnels in addition to conventional L2/L3 (wired) links.

Configurations herein are based, in part, on the observation that wireless bandwidth demand is growing exponentially with the user base, thus causing data plane operations to grow faster than control plane operations, as newer bandwidth hungry devices and applications result in the same user consuming additional bandwidth at an exponential rate. Unfortunately, conventional wireless networks suffer from the shortcoming that control plane and data plane operations are typically encapsulated in the same network element, and thus I/O bound data plane operations, such as bandwidth intensive graphics and video, may be constrained by the network element (i.e. controller), and are not readily adaptable to incremental improvements. It would be beneficial, therefore, to separate the control plane and data plane operations so that the data plane infrastructure can be modified to correspond to wireless (radio) changes without disrupting the corresponding control plane that may not be as susceptible to radio technology enhancement.

Accordingly, configurations herein substantially overcome such shortcomings by providing a split-plane architecture that separate the control and data plane operations typically encapsulated in a conventional wireless controller. Configurations herein provide a unified split-plane mobility switch that separates the data transport and switching in a separate hardware element, and performs control plane operations via exchanges with a centralized mobility controller using a mobility control protocol (MCP). The unified mobility switch (mobility switch) transports wired and wireless message traffic, in contrast to conventional wireless controllers through which all wireless traffic is funneled. A radio access plane (access plane) includes wireless access points coupled to the unified switches for completing the wireless link to individual mobile devices (user devices). through a virtual LAN (VLAN). Thus, data plane operations for mobility (wireless) users occur via the unified switch to a VLAN associated with a user though an access point to the mobile device, where the radio access plane completes the wireless link from the access point to the mobile device, responsive to a radio access controller (RAC) in the wireless controller. Control plane operations occur via a mobility agent (MA) in the unified switches, which performs routing table/control operations (once the RAC has completed admission and authentication) in a hierarchical rather than conventional peer-to-peer, manner, and is responsive to the mobility control protocol with the mobility controller (MC).

Conventional routing tables establish connectivity by a peer to peer identification, or so-called "ping" arrangement, in which each router identifies adjacent routers to which it is connected, and propagate connection information for populating a routing table at each router with the information of the adjacent routers. In contrast, configurations disclosed herein employ a mobility switch table at a mobility controller. The mobility switch performs wired and wireless transport, and thus has functionality of a wireless switch for coupling to wireless access points and performing roaming transitions between access points while also supporting wired L2 traffic. The mobility controller sends the mobility switch table to each mobility switch to identify the other switches that the mobility switch connects to. The mobility switch table indicates connectivity (visibility) between the mobility switches. Thus, merely being within range of another mobility switch does not imply connectivity; connectivity is explicitly designated by the mobility switch table, in contrast to conventional network visibility.

The mobility switch table therefore defines topology by directing message traffic according to the defined connectivity, rather than simply by switches within range. Therefore, the mobility switch table may define a hierarchy of switches, a central "gatekeeper" switch, a mesh arrangement in which each switch connects to each other switch, or any other suitable or arbitrary topology. In other words, conventional routing performs peer to peer propagation, but the mobility switch table is distributed in a top-down manner, which allows visibility definition with more specificity than conventional range or connection visibility.

In further detail, configurations herein provide a split-plane mobility switch including an interconnection to a network of mobility switches, such that the mobility switches define a data plane of the mobility domain, and each has a coupling to a mobility controller in a control plane of the mobility domain for receiving routing visibility information, in which the data plane performs routing and switching for user data traffic. Each of the mobility switches, or unified switches, includes a mobility agent configured to receive, from the mobility controller, a topology indicative of connectivity between the mobility switches, such that the mobility controller is computationally independent of the routing and throughput operations in each of the mobility switches, in which the mobility switches are unified to provide wired and wireless switching (routing). The mobility agent in each mobility switch is configured to identify, from the received topology, a subset of mobility switches of the plurality of mobility switches with which to establish connectivity, and typically an interface to an access point 130 for establishing communication, however the APs 130 are not mandatory—switches are capable of working irrespective of the availability of APs or not.

Each mobility switch is therefore a split plane mobility switch is configured for operation in a wireless network architecture comprising a control plane for monitoring and managing authentication and access of wireless devices to a wireless access point, and a data plane for receiving, routing and transporting data between wireless devices via the access points. The architecture further includes an access plane for maintaining wireless connectivity by managing RF connections to wireless users across a plurality of access points. The control plane and data plane are therefore implemented separately and independently scalable, such that a change in processing resources available to one of the control plane or data plane does not affect the processing resources available to other planes. Nevertheless, such an approach does not preclude a configuration in which the control and data plane are deployed in a single box internally using the same model—the split plane configuration does not necessarily enforce that the two planes must be deployed separately. For example, the data plane may include non-unified switching device also, for example as a dedicated wireless switching appliance. Alternatively or in addition, the control plane may be running in a virtual server (e.g. VMware®).

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Disclosed below is an example configuration of an enterprise mobility network defining a mobility domain such as that at a corporate or university campus or site adapted for use with a conventional LAN. As the unified switches support both wireless and wired message traffic, the unified switches perform functions of a wireless switch, in addition to wired routing, and therefore operate as a mobility switch to support roaming from one switch to another by a mobile device. The example mobility domain shown in the diagram below include a configuration of network elements, such as switches, access points, and user devices, in an arrangement and number suitable for illustrating the principles of the claimed invention, and other configurations may include other or additional network elements without departing from the substance of the claims.

The disclosed split-plane architecture for transporting wireless message traffic is employed for deploying a plurality of mobility switches in a mobility domain, such that the mobility switches define the data plane of the mobility domain and have a coupling to the mobility controller in the control plane of the mobility domain, in which the data plane performs routing and switching for user data traffic. Each mobility switch receives, through the mobility agent in each mobility switch, from the mobility controller, a topology indicative of connectivity between the mobility switches. The mobility controller is computationally independent from the routing and throughput operations in each of the mobility switches. Each mobility switch identifies, from the received topology, a set of mobility switches of the plurality of mobility switches with which to establish connectivity, and identifies, at each mobility switch, available access points for establishing communication with a mobility device corresponding to a user. Connectivity can be through a tunnel that spans across a layer-2 or layer-3 network (LAN or WAN). The connectivity can also be through a direct physical link in particular configurations. The tunnels in standard implementations use an encapsulation called CAPWAP using UDP. There are other popular encapsulations used (like Mobile IP, EtherIP etc.).

Figure 1:
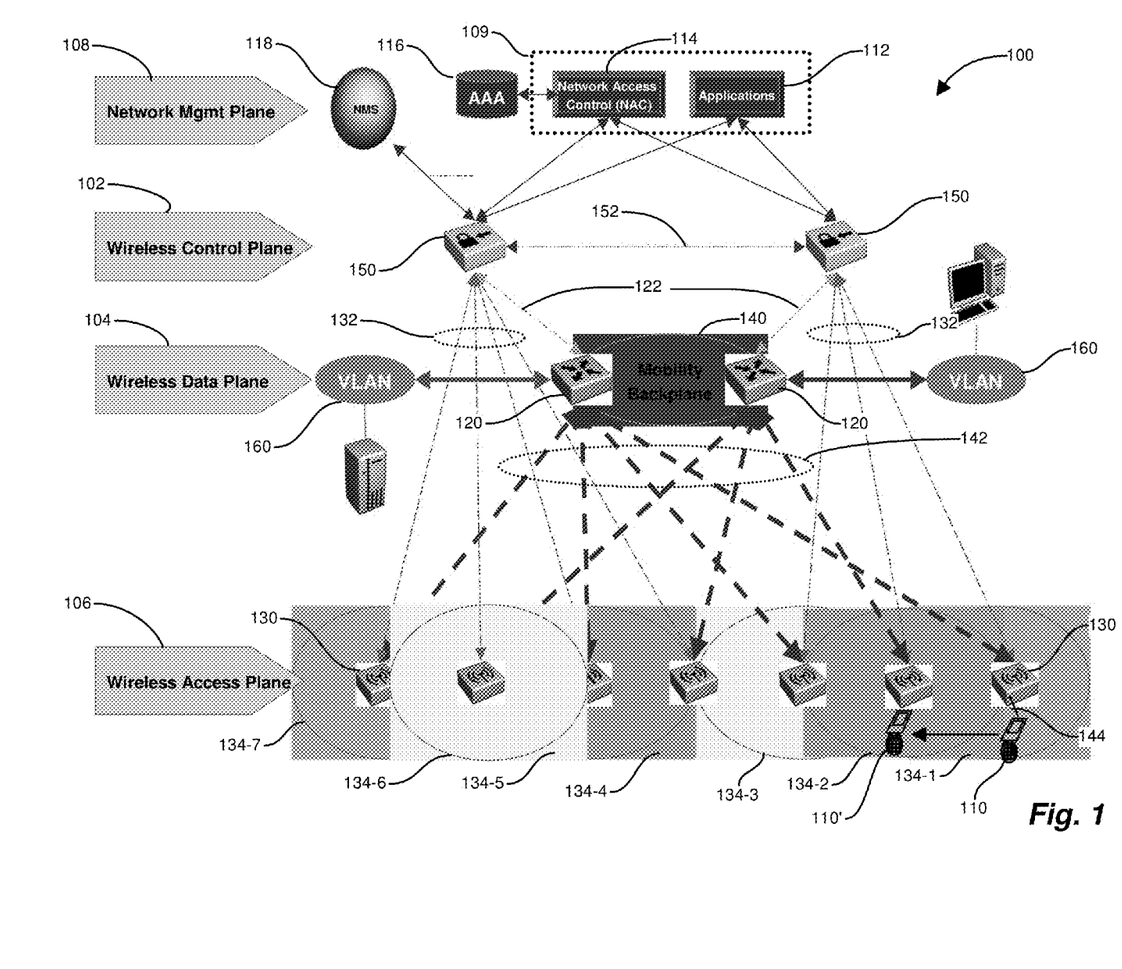
FIG. 1 is a context diagram of a mobility domain suitable for use with the present configuration.

FIG. 1 is a context diagram of a mobility domain suitable for use with the present configuration. Referring to FIG. 1, a mobility domain 100 is generally separable into distinct planes of parallel operations that occur in the wireless network defining the mobility domain 100. Referring to FIG. 1, the mobility domain 100 is an enterprise wide network that typically encompasses a particular site of a corporation or institution, and is analogous to an area traditionally served by a conventional LAN (local area network). In the mobility domain 100, a wireless control plane 102 performs user access and authentication through a wireless controller 150. The wireless control plane 102 therefore admits users to the mobility domain 100, and also transports control information in the form of configuration, routing table, security and radio access information, shown by arrows 122, 132 and 152 respectively. Once admitted to the mobility domain (i.e. logging on, activating a wireless user device 110, etc.), a typical user invokes the data plane 104 for performing message traffic transport. The data plane 104 performs transport and switching of data to and from the user device 110, using the control information supplied by the control plane 102 to mobility switches 120 and access points 130 using communication links 132 and 122 through a fabric of network connections 142. The wireless access plane 106 bridges the wireless gap from the wireless access point 130 to the user device 110 using a wireless connection 144, and includes modulation and transmission of the data via an RF channel medium. The wireless access plane 106 generally provides an overlapping arrangement of coverage areas 134-1 . . . 134-7 (134 generally) to support seamless roaming. A network management plane 108 provides centralized storage and coordination of items global to the mobility domain, such as applications 112, user authentication information and other network access control 114, and an access and authentication (AAA) database DB, 116. A network management system (NMS) 118 also provides operator oversight and diagnostic information such as SNMP based inquires. Virtual LANs (VLANs) 160 provide virtual bridging across a plurality of physical and/or wireless connections 142 and 144 to permit roaming from coverage area 134 to coverage area 134-N, as shown by the mobile device 110 in coverage area 134-1 moving to coverage area 134-2 as mobile device 110'. The mobility domain 100 therefore provides mobility connectivity for mobile devices 110 through wireless switches 120 and access points 130, and also performs wired switching in a mobility backplane 140 and for fixed devices, discussed further below.

Figure 2:
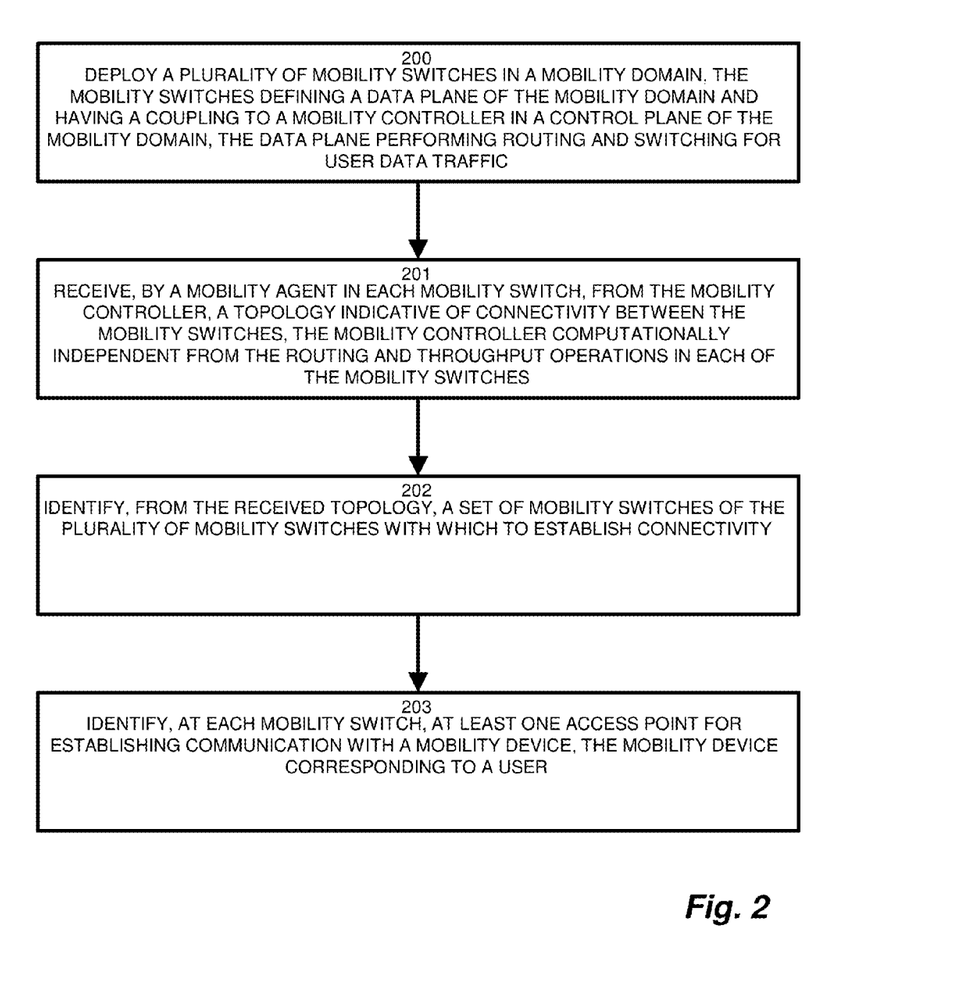
FIG. 2 is a flowchart of unified switch management in the environment of FIG. 1.

FIG. 2 is a flowchart of unified mobility switch 120 management in the environment of FIG. 1. Referring to FIGS. 1 and 2, the method for transporting wireless message traffic as disclosed herein includes deploying a plurality of mobility switches 120 in a mobility domain 100, such that the mobility switches 120 define the data plane 104 of the mobility domain 100 and have a coupling to the wireless controller 150 in the control plane 102 of the mobility domain 100, in which the data plane 104 performs routing and switching for user data traffic, as depicted at step 200. The mobility switches 120 receive, by a mobility agent 164 (discussed further in FIGS. 3 and 4 below) in each mobility switch 120, from the wireless controller 150, a topology indicative of connectivity between the mobility switches 120, thereby defining the mobility backplane 140 of the wireless mobility domain 100. The wireless controller 150 determines the visibility between the mobility switches 120 as reflected in the topology, rather then the physical port connections, thus the mobility switches may maintain wired or wireless connections to the other mobility switches 120. After disseminating the topology, the mobility controller 150 therefore remains computationally independent from the routing and throughput operations in each of the mobility switches 120, as disclosed at step 201. The method includes identifying, from the received topology, a set of mobility switches 120 of the plurality of mobility switches 120-N with which to establish connectivity, as shown at step 202. Each mobility switch 120 therefore determines the other mobility switches 120-N to which it will establish connections. The method then identifies, at each mobility switch 120, at available access points or other mobility switches 130 to provide remote access to wired VLANS via the other mobility switches 130 for establishing communication with a mobility device 110 such as a cellphone, laptop, netbook or PDA, in which the mobility device 110 corresponds to a user. The aggregated coverage area of each access point 130 forms a local wireless coverage area (i.e. WiFi) for providing uninterrupted, seamless wireless coverage to a user community.

Figure 3:
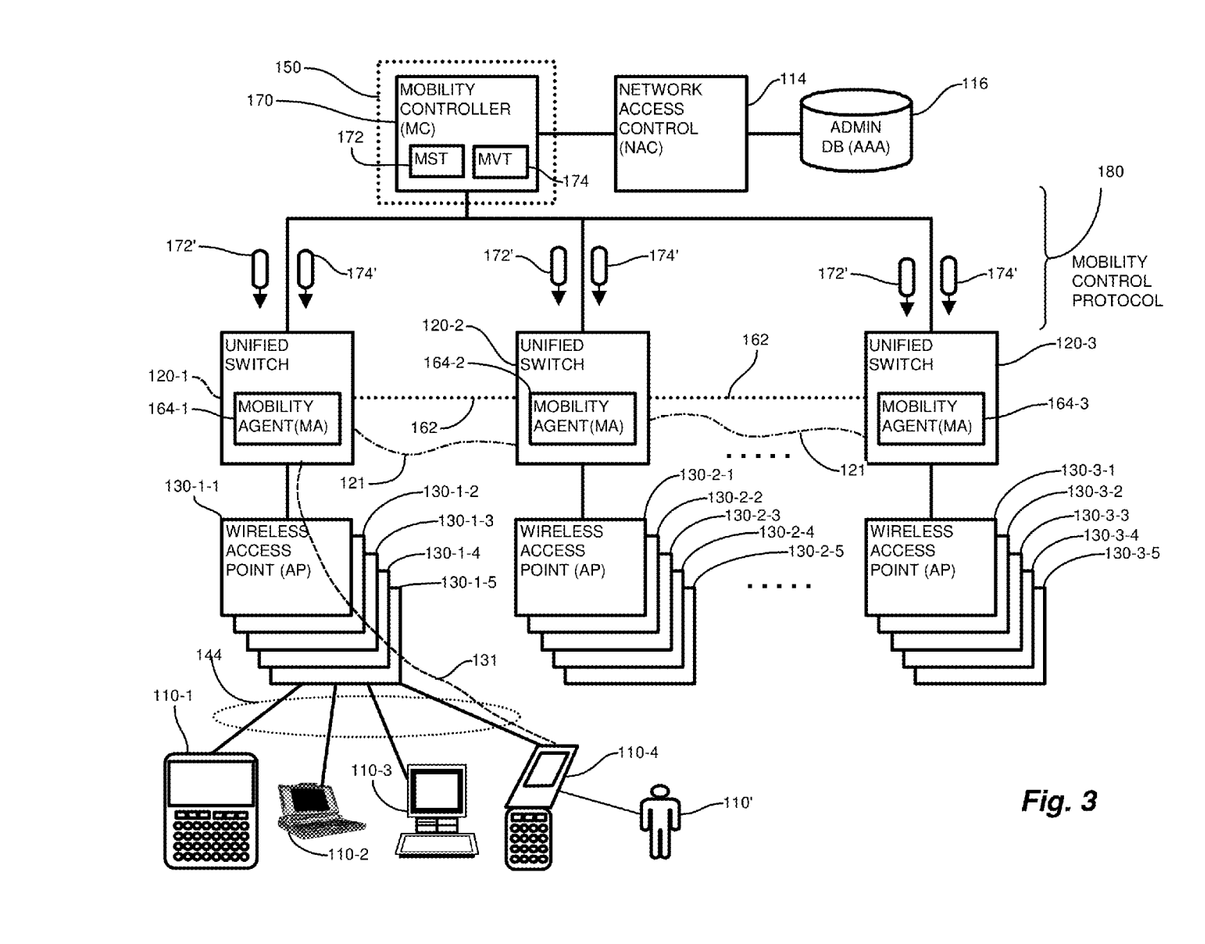
FIG. 3 is a block diagram of unified switch configuration operable with the flowchart in FIG. 2.

FIG. 3 is a block diagram of unified switch configuration operable with the flowchart in FIG. 2. Referring to FIGS. 1 and 3, the unified mobility switches 120-1 . . . 120-3 (120 generally) occupy the wireless data plane 104. A mobility controller 170 in the wireless controller 150 performs the control plane 102 operations of computing connectivity and topology by generating a mobility switch table 172 (MST) and a mobility VLAN table (MVT) 174, and sends mobility routing information 172' and mobility VLAN information 174' to each unified switch 120-1 . . . 120-3 (120 generally). Each unified switch 120 further couples to one or more wireless access points 130-1-1 . . . 130-3-5 (130 generally), for establishing wireless links 144 with mobile devices 110-1 . . . 110-4 (110 generally) of a corresponding user 110'. Mobility tunnels 121 maintain connectivity between the unified switches 120 for roaming mobile devices 110' (users), and access tunnels 131 provide connectivity from the unified switches 120 to the access point 130 serving the roamed users 110'.

A mobility agent 164-1 ... 164-3 (164 generally) in each switch 120 receives the mobility routing information 172' and VLAN information 174' for performing wireless routing and roaming operations. A mobility control protocol 180 couples the mobility controller 170 to each of the mobility agents 164 for providing control plane 102 routing and switching information to the individual mobility switches 120. In contrast to conventional peer-to-peer routing, in which routing table information propagates from router to router as each router indicates a "next hop" to its neighbor, the mobility control protocol 180 distributes the routing information 172' and 174' in a top-down manner to each mobility agent 164. The top down dissemination of the MST 172 and mobility VLAN table 174 information allows a centralized topology management such that each mobility switch 120 need not have visibility of adjacent mobility switches 120-N, but rather may be arranged in view of associated wireless access points 130 and related coverage areas 134, discussed further below. The switches 120 handle roaming mobile devices 110 by establishing remote VLANs to a switch 120-N for supporting a mobile device 110 (user) that roamed into the AP coverage area 134. A mobility VLAN management protocol (MVMP) exists between the AP 130 and mobility switch 120, such that the trigger for establishing the remote VLAN 160 comes from the AP 130 first and then the switch 120 propagates it to the peer switches 120 supporting an access point 130 in the roamed-to coverage area 134 by invoking the mobility VLAN management protocol, shown by dotted lines 162.

Figure 4:
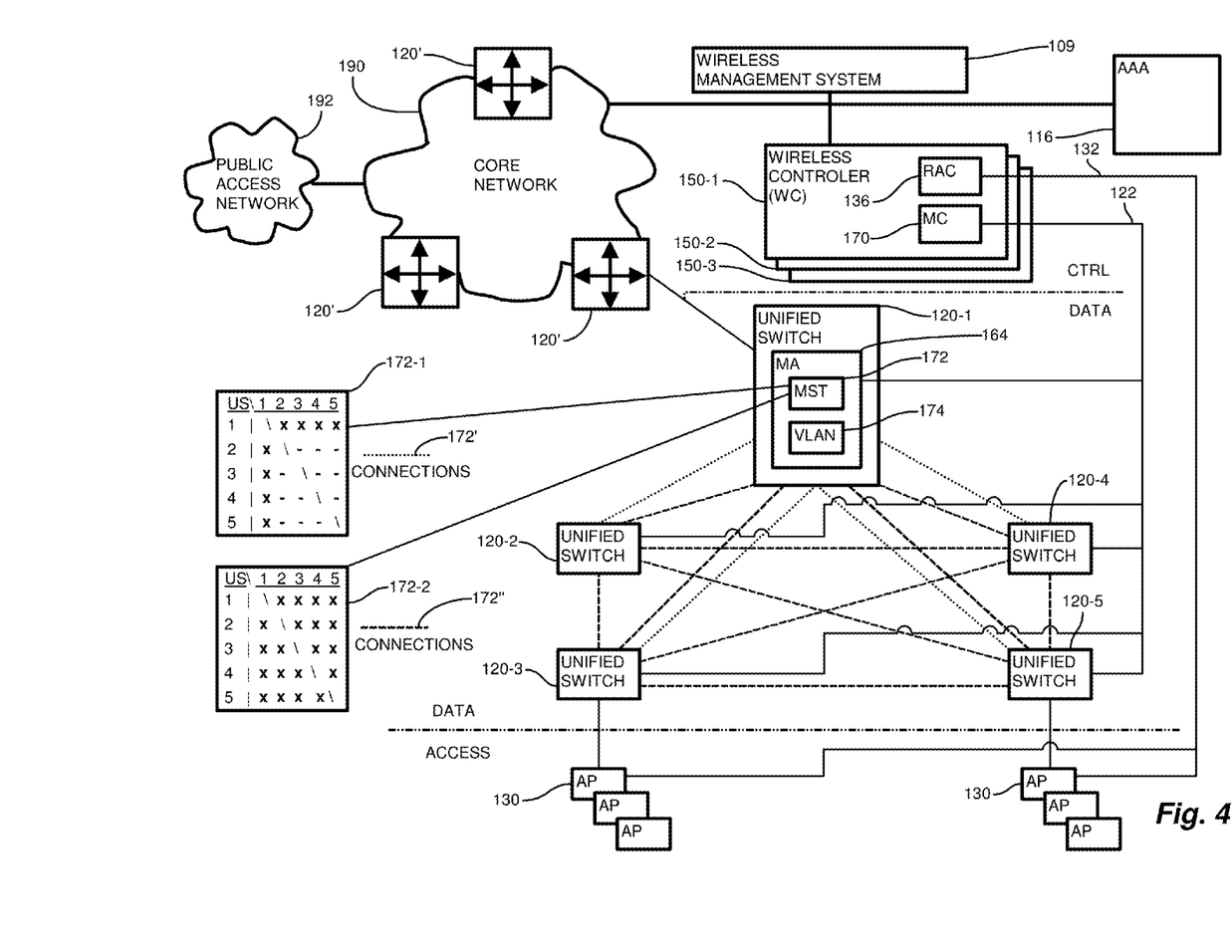
FIG. 4 is a diagram of a wireless LAN configured for operation in the mobility domain of FIG. 1.

FIG. 4 is a diagram of a wireless LAN configured for operation in the mobility domain of FIG. 1. Referring to FIGS. 1, 3 and 4, the wireless control plane 102 may be implemented as a plurality of wireless controllers (servers) 150-1 ... 150-3 (150 generally), each including the mobility controller 170 and a radio access controller (RAC) 136 for transmitting security, bandwidth and frequency information to the access points 130 via control plane links 132. The wireless controllers 150 are scalable to suit the size and number of access points 130 in the mobility domain 100, and are responsive to the wireless management system 109 for network admission control 114 operations via the access and authentication DB 116 via the radio access controller 136. A core network 190, including other wired switches 120', is also responsive to the wireless management system 109 for providing a public access network 192 such as the Internet and other enterprise-wide connectivity throughout the enterprise served by the mobility domain 100. It should be noted that, depending on the needs of the particular enterprise, the mobility domain 100 may extend as broadly as the underlying LAN core network 190, or the mobility domain 100 may be defined by a subset of sites equipped with wireless access points 130. The core network 190 may itself be comprised entirely of unified switches 120. The disclosed configuration is an example arrangement, as the enhanced throughput of the disclosed unified split plane arrangement increases when an enterprise core network 140 itself is unified.

Continuing to refer to FIGS. 3 and 4, in the example configuration disclosed, the mobility control protocol 180 transmits the mobility switch table 172 to the mobility agent 164 in each unified switch 120. The unified switches 120 establish connections to each other as defined by the mobility switch table 172. Each unified switch 120 includes a mobility agent 124 having a mobility switch table 172 (MST) and a mobility VLAN table 174. The mobility switch table 172 identifies, for each unified switch 120, other unified switches 120-N to connect to. The mobility VLAN table 174 denotes VLANs, which define how a set of unified switches 120 provide access to wired or wireless VLANs through access points for a mobility device 110 to communicate with other devices and to allow roaming to access points of other unified switches 120. As alluded to above, the mobility switch table 172 provides a topology arrangement independently of the visibility or connectivity of the unified switches 120; in other words, the unified switches 120 need not establish a connection with every other switch 120 that they have visibility of (wired or wireless), as is typical in wired networks. Rather, the mobility switch table 172 identifies connectivity of the unified switches 120, thus allowing for a specific topology which may range from a highly connected mesh fabric to a hierarchical approach.

The mobility topology therefore includes a mobility switch table 172, such that each of the mobility agents 164 is responsive to the mobility switch table 172 via the mobile control protocol 180. The mobility switch table 172 defines a topology by identifying, for each mobility switch 120, a set of other mobility switches 120-N to establish connections to. Also included is a mobility VLAN table 174, such that the mobility VLAN table 174 is indicative of, for each mobility device 110, an access point 130 and a mobility switch 120 employed by the mobility device for message traffic. The data plane 104 is therefore defined by a plurality of mobility switches 120, in which each mobility switch 120 has a corresponding the mobility agent 164, and invokes selective connectivity to other mobility switches 120 according to the mobility switch table 172 for data traffic between wireless mobility devices 110 and the access points 130.

The mobility switch table 172 defines switch visibility for each mobility switch in the mobility domain 100 and is common to each mobility switch 120 in the mobility domain. In a particular arrangement, an example MST 172-1 depicts a hierarchical topology, in which each of switches 120-2 ... 120-5 connects to 120-1 at the top of the hierarchy, as shown by the 'x' entries in the MST 172-1, and depicted by connection lines 172'. An inclusive mesh topology is illustrated by the connectivity in MST 172-2, in which each unified switch 120-1 ... 120-5 connects to each other switch in a "star" arrangement, as depicted by connection lines 172". Various other topologies may be specified by denoting entries in the mobility switch table 172.

Figure 5:
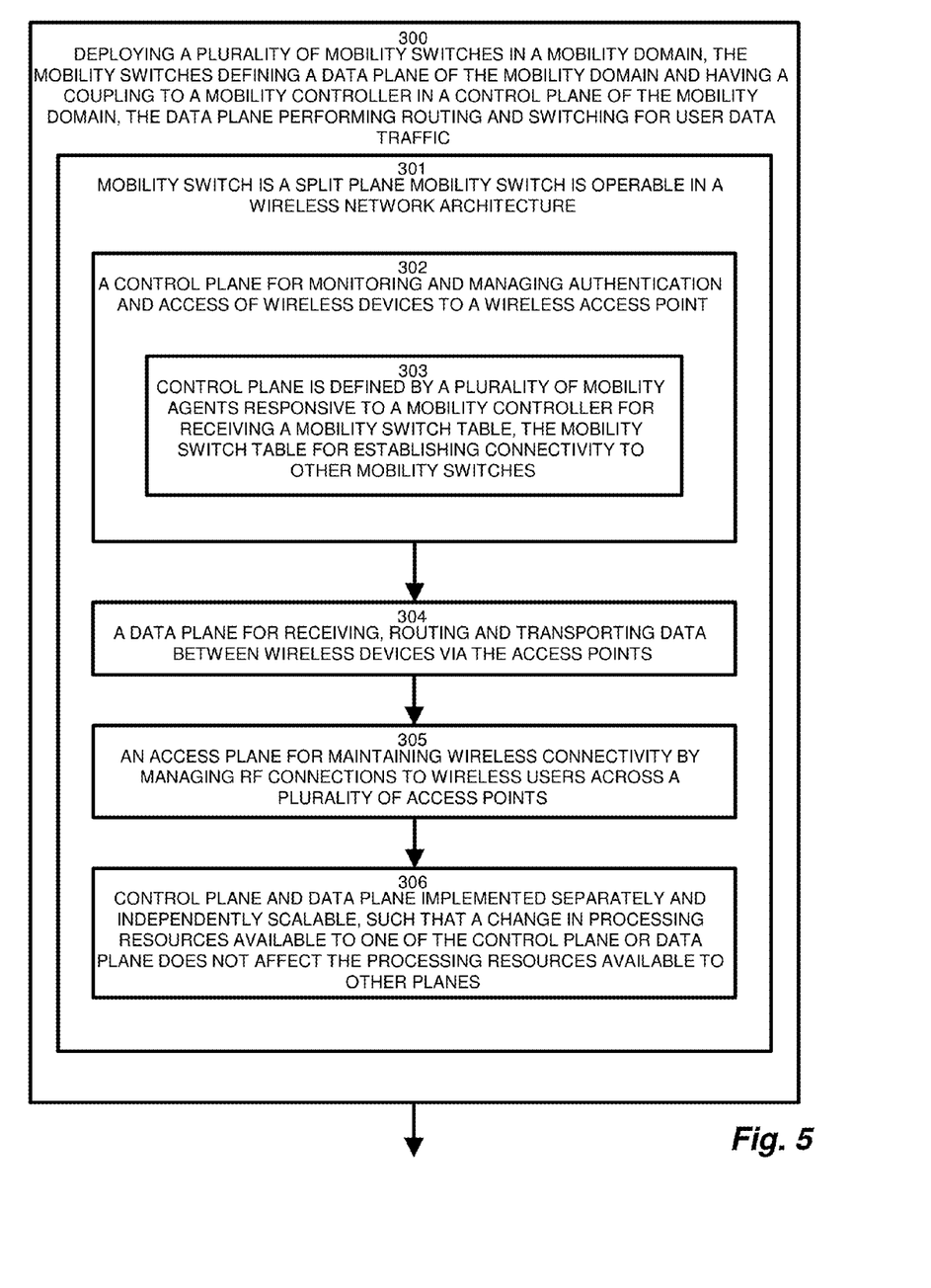
FIGS. 5-7 are a flowchart of wireless LAN operation in the configuration of FIG. 4.
Figure 6:
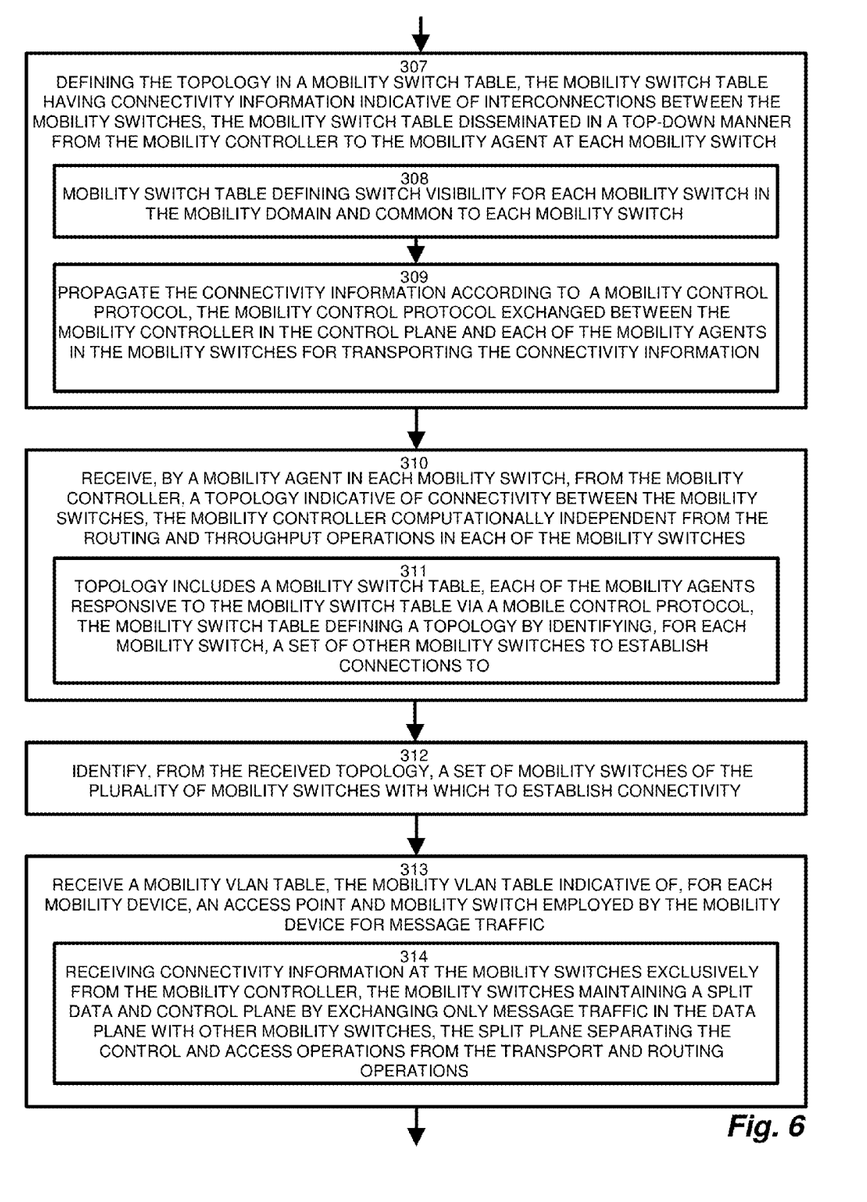
Figure 7:
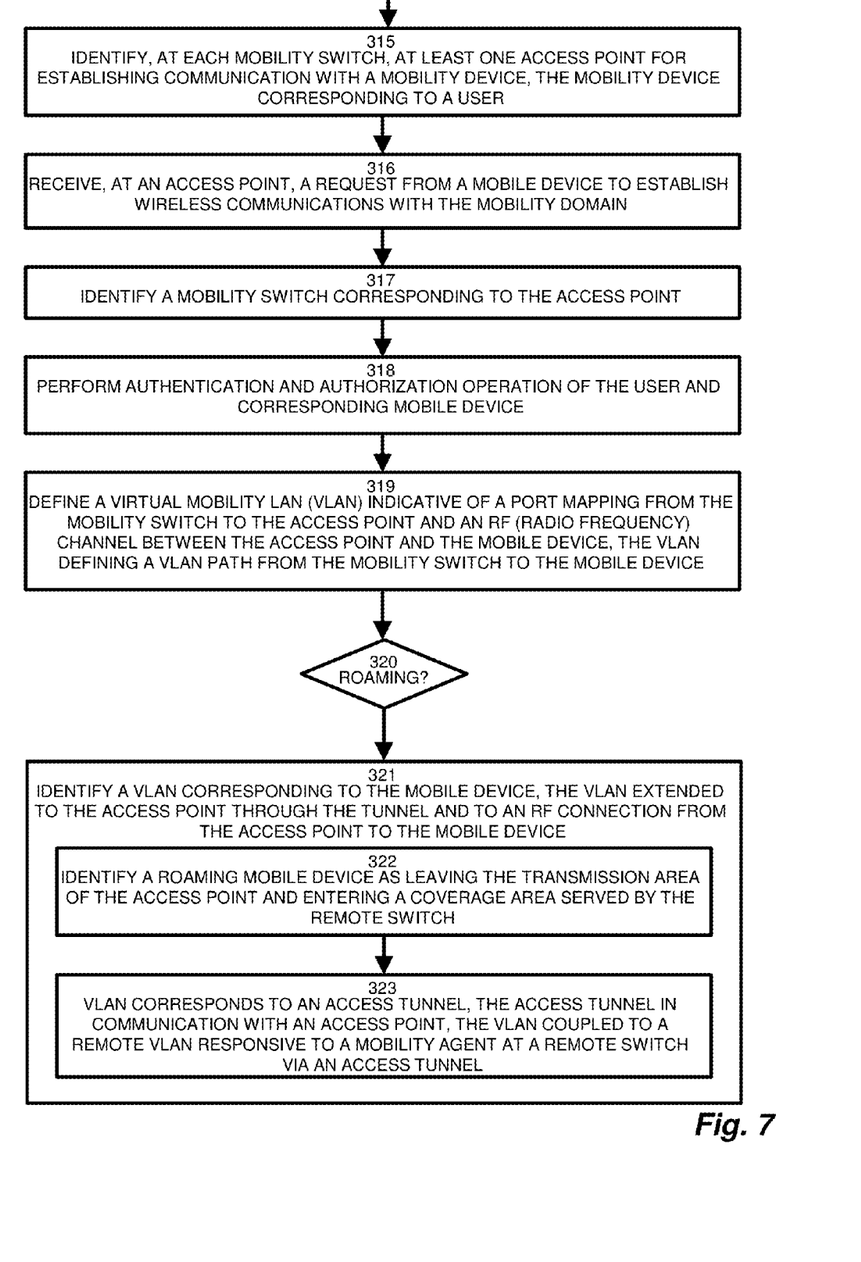

FIGS. 5-7 are a flowchart of wireless LAN operation in the configuration of FIG. 4. Referring to FIGS. 1 and 3-7, transporting wireless message traffic includes deploying a plurality of mobility switches 120 in a mobility domain 100, such that the mobility switches 120 define a data plane 104 of the mobility domain 100, as depicted at step 300. Each of the mobility switches has a coupling to a mobility controller 170 in the control plane 102 of the mobility domain 100, such that the data plane 104 performs routing and switching for user data traffic responsive to control plane topology and VLAN port mapping from the mobility controller 170. In the example configuration disclosed, the mobility switch is a split plane mobility switch is operable in a wireless network architecture, as shown at step 301. The split plane architecture includes a control plane 102 for monitoring and managing authentication and access of wireless devices to a wireless access point, as depicted at step 302, and a data plane 104 for data transport operations. The control plane 102 is defined by a plurality of mobility agents 164, each occupying a unified switch 120 for wireless mobility and responsive to a mobility controller 170 for receiving the mobility switch table 172, in which the mobility switch table 172 is for establishing connectivity to other unified switches (mobility switches) 120, as disclosed at step 303.

The mobility domain 100 further includes a data plane 104 for receiving, routing and transporting data between wireless devices 110 via the access points 130, as shown at step 304. An access plane 106 maintains wireless connectivity by managing RF connections 144 to wireless users 110' via the mobility devices 110 across a plurality of access points 130, as depicted at step 305. The disclosed arrangement implements the control plane and data plane separately and in a manner that they are independently scalable, such that a change in processing resources available to one of the control plane 102 or data plane 104 does not affect the processing resources available to other planes 102, 104, as clarified at step 306. In contrast to conventional wireless controller deployment, in which the same controller handles processing demands of the control plane 102 and the data plane 104, the disclosed approach separates the data plane 104 processing base by employing the mobility agent 164 to define adjacent switch 120 visibility. Thus, the routing capabilities of the data plane 104 may be enhanced, such as to handle increasingly bandwidth-hungry applications of the same user base, without uprooting the infrastructure defined by the control plane 102.

The mobility controller 170 defines the topology in a mobility switch table 172, such that the mobility switch table 172 has connectivity information indicative of interconnections between the mobility switches 120, as depicted at step 307. The mobility controller 170 disseminates the mobility switch table 172 in a top-down manner from the mobility controller 170 to the mobility agent 164 at each mobility switch 120, as shown by transmitted mobility switch table 172'. Alternatively, the mobility controller may distribute topology information based on switch visibility of other switches, rather than downloading the entire MST 172. The mobility switch table 172 therefore defines switch visibility for each mobility switch 120 in the mobility domain 100 and is common to each mobility switch 120 in the mobility domain 100, as shown at step 308.

In the example configuration, the mobility controller 170 propagates the connectivity information in the MST 172 according to a mobility control protocol 180, such that the mobility control protocol 180 is exchanged between the mobility controller 170 in the control plane 102 and each of the mobility agents 164 in the mobility switches 120 for transporting the connectivity information 172', as depicted at step 309. Each of the switches 120 in turn, receives, by a mobility agent 164 in each mobility switch 120, from the mobility controller 170, the topology indicative of connectivity between the mobility switches 120, such that the mobility controller 170 is computationally independent from the routing and throughput operations in each of the mobility switches 120, as shown at step 310. In the example configuration shown, the topology includes the mobility switch table 172, in which each of the mobility agents 164 is responsive to the mobility switch table 172 via a mobile control protocol 180, such that the mobility switch table 172 defines the topology by identifying, for each mobility switch 120, a set of other mobility switches 120-N to establish connections to, as depicted at step 311.

Each mobility switch 120 identifies, from the received topology, a set of mobility switches 120-N of the plurality of mobility switches with which to establish connectivity, as disclosed at step 312. In the example configuration, each mobility switch 120 further receives a mobility VLAN table 174, in which the mobility VLAN table 174 is indicative of, for each mobility device 110, an access point 130 and mobility switch 120 employed by the mobility device 110 for message traffic, as depicted at step 313. In the example arrangement shown, distribution of the MST 172 and VLAN table 174 maintains control and data plane separation by receiving connectivity information at the mobility switches 120 exclusively from the mobility controller 170, such that the mobility switches 120 therefore maintain a split data 194 and control plane 102 by exchanging data transport information, such as message traffic and VLAN membership information, in the data plane 104 with other mobility switches, the split plane therefore separating the control and access operations from the transport and routing operations, as shown at step 314.

In the topology, each mobility switch 120 may couple to t one or more access points 130 for establishing communication with a mobility device 110, such that the mobility device 110 corresponds to a user 110' of the mobility domain 100, as depicted at step 315. Upon a user initiation via the mobile device 110, the access point receives a request from the mobile device 110 to establish wireless communications with the mobility domain 100, as show at step 316. The request triggers an identification of a mobility switch 120 corresponding to the access point 130, as shown at step 317 typically a local VLAN of the mobility device unless the user is roaming. The request first triggers an authentication and authorization operation of the user and corresponding mobile device 110 with the wireless control plane 102 through channel 132. This results in identifying a Mobility VLAN 160 for the user and the control plane passes this information to the access point 130 through the control channel 132, as depicted at step 318.

The unified mobility switch 120 establishes or defines a local virtual LAN (VLAN) 160 indicative of a virtual port mapping of a data tunnel from the mobility switch 120 to the access point 130 and an RF (radio frequency) link 144 between the access point 130 and the mobile device 110, as depicted at step 319. A VLAN path 131 thus defines a broadcast domain from the mobility switch 120 to the mobile device 110. This VLAN path 131 includes a tunnel between the switch 120 and the AP 130, and the mobile device 110 is associated to that tunnel on the AP side. The VLAN path 131 thus includes an access tunnel to the access point 130, and the wireless link 144 from the AP to the mobile device 110. In a typical configuration, this includes associating ports with VLANs 160, in which the ports correspond to wired routing destinations such as wired switches 120, 120' and the VLANs corresponding to individual mobility devices 110 accessible via an access point 130. As individual devices 110 are assigned unique VLANs 160, there can be multiple (100s) of mobile devices 110 in one mobility VLAN including the same AP 130. In the mobility domain 100, longer range wireless transmissions usually experience greater interference and packet loss, this it is usually beneficial to employ wired transmissions up to an access point 130 nearest the mobile device 110.

Upon detecting a roaming condition triggered by the mobile device 110 moving into an adjacent coverage area 134-N, shown by the check at step 320, the mobility switch 120 identifies the VLAN 160 corresponding to the mobile device 110, such that the VLAN is now extended to the access point 130 through the data tunnel and to the RF connection 144 from the access point 130 to the mobile device 110 (described above), as depicted at step 321. The mobility switch 120 identifies a roaming mobile device as leaving the coverage area of the access point 130 and entering a coverage area 134 served by the roamed access point and possibly a remote switch 120. The movement across coverage area at an RF level is identified by the AP 130 and the Wireless Control Plane (102). At the data plane 104 level, this is expressed as a 'station move' from access tunnel 131 of one AP 130 to the access tunnel 131 of another 'roamed to' access point 130. In the example configuration disclosed, the VLAN 160 corresponds to an access tunnel 131, such that the access tunnel 131 is in communication with the access point 130 and the VLAN is coupled to a remote VLAN responsive to a mobility agent 164 at a remote switch 120 via an access tunnel, as disclosed at step 322, and identifies a remote VLAN, such that the VLAN corresponds to an access tunnel 131, in which the access tunnel 131 is in communication with an access point 130, and such that the VLAN couples to a remote VLAN 160 responsive to a mobility agent 164 at a remote switch 120 via the mobility tunnel 121, as depicted at step 323.

A further feature of the independence of the split plane architecture is such that the split plane includes a control plane, a data plane and an access plane such that performing failover of one of the planes does not interfere with operations in another plane.

In particular configurations, the unified switch detects extraneous wireless signals, and identifies rogue routers by receiving from a wireless destination not connected to at least one of the mobility switches in the mobility domain.

Those skilled in the art should readily appreciate that the programs and methods for split-plane wireless network management as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for split plane wireless network management has been particularly shown and described with references to embodiments thereof, it will be understood by those skilled in the art that various changes in form and details may be made therein without departing from the scope of the invention encompassed by the appended claims.

What is claimed is:

1. A method for transporting wireless message traffic comprising:
    deploying a plurality of mobility switches in a mobility domain, the mobility switches defining a data plane of the mobility domain and having a coupling to a mobility controller in a control plane of the mobility domain, the data plane performing routing and switching for user data traffic;
    receiving, by a mobility agent in each mobility switch, from the mobility controller, a topology indicative of connectivity between the mobility switches, the mobility controller computationally independent from the routing and throughput operations in each of the mobility switches;
    identifying, from the received topology, a set of mobility switches of the plurality of mobility switches with which to establish connectivity;
    identifying, at each mobility switch, a link to least one access point or other mobility switch for establishing communication with a mobility device, the mobility device corresponding to a user;
    wherein the topology includes a mobility switch table, each of the mobility agents responsive to the mobility switch table via a mobile control protocol, the mobility switch table defining a topology by identifying, for each mobility switch, a set of other mobility switches to establish connections to;
    receiving, at an access point, a request from a mobile device to establish wireless communications with the mobility domain;
    identifying a mobility switch corresponding to the access point; and
    defining a virtual LAN (VLAN) indicative of a port mapping from the mobility switch to the access point and an RF (radio frequency) link between the access point and the mobile device, the VLAN defining a broadcast domain from the mobility switch to the mobile device.

2. The method of claim 1 further comprising:
    identifying a VLAN corresponding to the mobile device, the VLAN extended to the access point and to the RF link from the access point to the mobile device.

3. The method of claim 1 wherein the control plane is defined by a plurality of mobility agents responsive to a mobility controller for receiving a mobility switch table, the mobility switch table for establishing connectivity to other mobility switches.

4. The method of claim 3 further comprising associating ports with VLANs, the ports corresponding to wired routing destinations and the VLANs corresponding to individual mobility devices accessible via an access point.

5. The method of claim 4 wherein the VLAN corresponds to an access tunnel, the access tunnel in communication with an access point, the VLAN coupled to a remote VLAN responsive to a mobility agent at a remote switch via an access tunnel; and
    identifying a roaming mobile device as leaving the coverage area of the access point and entering a coverage area served by the remote switch.

6. The method of claim 1 further comprising defining the topology in a mobility switch table, the mobility switch table having connectivity information indicative of interconnections between the mobility switches, the mobility switch table disseminated in a top-down manner from the mobility controller to the mobility agent at each mobility switch.

7. The method of claim 6 further comprising propagating the connectivity information according to a mobility control protocol, the mobility control protocol exchanged between the mobility controller in the control plane and each of the mobility agents in the mobility switches for transporting the connectivity information.

8. The method of claim 7 further comprising receiving a mobility VLAN table, the mobility VLAN table indicative of, for each mobility device, an access point and mobility switch employed by the mobility device for message traffic.

9. The method of claim 8 further comprising receiving connectivity information at the mobility switches exclusively from the mobility controller, the mobility switches maintaining a split data and control plane by exchanging only data transport information including message traffic in the data plane with other mobility switches, the split plane separating the control and access operations from the transport and routing operations.

10. A split-plane mobility switch comprising:
an interconnection to at least one other of a plurality of mobility switches, the mobility switches defining a data plane of the mobility domain and having a coupling to a mobility controller in a control plane of the mobility domain, the data plane performing routing and switching for user data traffic;
a mobility agent configured to receive, from a mobility controller, a topology indicative of connectivity between the mobility switches, the mobility controller computationally independent of the routing and throughput operations in each of the mobility switches;
the mobility agent configured to identify, from the received topology, a subset of mobility switches of the plurality of mobility switches with which to establish connectivity;
an interface to at least one access point for establishing communication with a mobility device, the mobility device corresponding to a user;
wherein the mobility switch is a split plane mobility switch operates in a wireless network architecture comprising:
a control plane for monitoring and managing authentication and access of wireless devices to a wireless access point;
a data plane for receiving, routing and transporting data between wireless devices via the access points; and
an access plane for maintaining wireless connectivity by managing RF connections to wireless users across a plurality of access points;
the control plane and data plane implemented separately and independently scalable, such that a change in processing resources available to one of the control plane or data plane does not affect the processing resources available to other planes.

11. The mobility switch of claim 10 wherein the topology includes:
a mobility switch table, each of the mobility agents responsive to the mobility switch table via a mobile control protocol, the mobility switch table defining a topology by identifying, for each mobility switch, a set of other mobility switches to establish connections to; and
a mobility VLAN table, the mobility VLAN table indicative of, for each mobility device, an access point and mobility switch employed by the mobility device for message traffic, the data plane defined by a plurality of mobility switches, each of the mobility agents having a corresponding mobility switch and having selective connectivity to other mobility switches according to the mobility switch table for data traffic between wireless devices and the access points.

12. The mobility switch of claim 11 wherein the mobility switch table defines switch visibility for each mobility switch in the mobility domain and common to each mobility switch in the mobility domain.

13. The method of claim 10 wherein the split plane includes a control plane, a data plane and an access plane, and further includes performing failover of one of the planes without interfering with operations in another plane.

14. The method of claim 10 further comprising identifying rogue routers by receiving from a wireless destination not connected to at least one of the mobility switches in the mobility domain.

15. A computer program product having computer program code encoded as a set of instructions on a non-transient computer readable storage medium that, when executed by a processor, cause the computer to perform a method for managing a split-plane wireless network, the method comprising:
deploying a plurality of mobility switches in a mobility domain, the mobility switches defining a data plane of the mobility domain and having a coupling to a mobility controller in a control plane of the mobility domain, the data plane performing routing and switching for user data traffic;
receiving, by a mobility agent in each mobility switch, from the mobility controller, a topology indicative of connectivity between the mobility switches, the mobility controller computationally independent from the routing and throughput operations in each of the mobility switches;
identifying, from the received topology, a set of mobility switches of the plurality of mobility switches with which to establish connectivity;
identifying, at each mobility switch, a link to least one access point or other mobility switch for establishing communication with a mobility device, the mobility device corresponding to a user;
wherein the topology includes a mobility switch table, each of the mobility agents responsive to the mobility switch table via a mobile control protocol, the mobility switch table defining a topology by identifying, for each mobility switch, a set of other mobility switches to establish connections to;
receiving, at an access point, a request from a mobile device to establish wireless communications with the mobility domain;
identifying a mobility switch corresponding to the access point; and
defining a virtual LAN (VLAN) indicative of a port mapping from the mobility switch to the access point and an RF (radio frequency) link between the access point and the mobile device, the VLAN defining a broadcast domain from the mobility switch to the mobile device.

16. The computer program of claim 15 further comprising defining a split plane arrangement of control plane and data plane operations the split plane separating the control and access operations from the transport and routing operations such that the admission and access operations of the control plane are computationally independent from the routing and throughput operations in each of a plurality of mobility switches defining the data plane.

17. The computer program of claim 16 wherein the split-plane arrangement further comprises performing the control plane and data plane operations in separate processing realms under the control of independent processors, the separate processing realms such that processing demands of one of the plane does not consume processing resources of another plane.

* * * * *